United States Patent
Hirai (10) Patent No.: US 6,909,546 B2
(45) Date of Patent: Jun. 21, 2005

(54) MULTIPOINT LUMP HOMOGENIZING OPTICAL SYSTEM

(75) Inventor: Takayuki Hirai, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/733,284

(22) Filed: Dec. 12, 2003

(65) Prior Publication Data

US 2004/0150887 A1 Aug. 5, 2004

(30) Foreign Application Priority Data

Jan. 31, 2003 (JP) ........................................ 2003-022967

(51) Int. Cl.[7] ............................ G02B 27/44; G02B 5/18
(52) U.S. Cl. ........................................ 359/566; 359/565
(58) Field of Search ................................ 359/565, 566, 359/571, 626, 567; 219/121.67, 121.7

(56) References Cited

U.S. PATENT DOCUMENTS

| | | | |
|---|---|---|---|
| 3,476,463 A | | 11/1969 | Kreuzer |
| 5,745,511 A | * | 4/1998 | Leger ........................... 372/19 |
| 5,835,647 A | | 11/1998 | Fischer et al. |
| 6,295,168 B1 | * | 9/2001 | Hoffnagle et al. .......... 359/708 |
| 6,433,301 B1 | | 8/2002 | Dunsky et al. |
| 2002/0001090 A1 | | 1/2002 | Cemic et al. |

FOREIGN PATENT DOCUMENTS

| | | |
|---|---|---|
| JP | 9-61610 | 3/1997 |
| JP | 10-153750 A | 6/1998 |
| JP | 2002-202414 A | 7/2002 |

OTHER PUBLICATIONS

Dickey Fred M, et al., "Gaussian laser beam profile shaping," Optical Engineering, vol. 35, No. 11, Nov. 1996, pp. 3285–3295.

Wyrowski, F. "Diffractive optical elements: Iterative calculation of quantized blazed phase structures.", J. Opt. Soc. Am. A, vol. 7, No. 6, Jun. 1990, pp. 961–969.

* cited by examiner

*Primary Examiner*—Leonidas Boutsikaris
(74) *Attorney, Agent, or Firm*—McDermott Will & Emery LLP (57) ABSTRACT

When a Gaussian power distribution laser beam is converted into a uniform power density beam by a converging homogenizing DOE and is divided into a plurality of homogenized beams by a diverging DOE, the power of the separated beam spatially fluctuates. For alleviating the power fluctuation of the beams, an aperture mask having a window wider than a section of the homogenized beam but narrower than a noise region at a focus of the converging homogenizer DOE. Since a homogenized beam can pass the aperture mask as a whole, the power fluctuation, in particular, near edges is reduced.

8 Claims, 8 Drawing Sheets

Fig. 4 phases of homogenizer DOE

Fig. 5 beam intensity distribution at aperture mask

Fig. 8 phases (single period) of diverging DOE

MULTIPOINT LUMP HOMOGENIZING OPTICAL SYSTEM

BACKGROUND OF THE INVENTION

1. Field of the Invention

This invention relates to an improvement of a laser processing apparatus for changing a Gaussian power distribution beam of a high power laser, for example, a YAG laser, $CO_2$ laser, excimer lasers etc., into a uniform tophat power distribution beam which has a constant power density in a definite area, and multiplying the tophat distribution beam into a plurality of identical beams by a DOE (diffraction optical element) and heat-treating, annealing, hole-boring, welding or polishing many points on an object material.

This application claims the priority of Japanese Patent Application No.2003-22967 filed on Jan. 31, 2003, which is incorporated herein by reference.

Beams generated by gas lasers or solid state lasers have an axial-symmetric, nonuniform power distribution which has a higher power density at a center and a lower power density at a periphery. The nonuniform power distribution of the gas laser or solid state laser beams is akin to a Gaussian distribution. Thus, we approximate a power distribution of original laser beams as a Gaussian distribution. If object laser processing requires a uniform power distribution beam, the original Gaussian beam should be converted into the uniform power distribution beam by expanding a central part and shrinking a peripheral part of the original Gaussian beam by some optical apparatus.

The Gaussian/uniform distribution conversion is achieved, for example, by a set of two lenses consisting of an intensity-modifying lens L1 and a phase-adjusting lens L2. The first intensity-modifying lens L1 has a central concave part for expanding a central portion of an input Gaussian beam and a peripheral circular convex portion for shrinking a peripheral portion of the Gaussian beam. The intensity-modifying lens L1 produces a uniform power distribution beam from the Gaussian beam. The reformed beam includes imparallel rays with irregular phases. The phase-adjusting lens L2 which has a curvature surface for compensating the L1 lens restores the common phase and parallelism to the beam. A beam output from the L2 lens is a set of phase-aligning, parallel rays.

The conversion from a Gaussian power laser beam to a uniform power beam is called "homogenizing". An apparatus of the Gaussian/uniform conversion is called a "homogenizer" or "homogenizing optics". A word "tophat" is used for representing a uniform power distribution in a definite area with a discontinuous boundary. Another word "super-gaussian" is used for representing a quasi-uniform power distribution in a definite area with a continuous boundary in this description. Equalizing a sum of amplitudes of light rays at a point is not enough for making a uniform power (tophat) beam. Light has amplitude and a phase. If rays are out of phase, a beam which is once converted to be a tophat beam at a point, soon degenerates to be a non-uniform beam. Thus, "homogenize" denotes not only to equalize the power density (or amplitude) but also to equalize phases and to keep rays to be parallel. Phases are often forgotten. But phases are as important as intensity for light. Like a plane wave, a homogenized tophat beam (f=1 at r≦a, f=0 at r>a) should have properties of uniform power, parallelism, common phase (in-phase) and monochromacity.

2. Description of Related Art

Many contrivances have been proposed for obtaining a uniform power (tophat) distribution beam from a Gaussian beam.

(1) Beam Splitting/Superposing Method

Chalidescopes or segment mirrors have two-dimensional lattice cells which divide a Gaussian laser beam into M×M lattice beams and superpose the M×M divided beams at a single cell object point. Since all the cell beams are randomly added in the single point and in-cell fluctuation is cancelled, the power distribution should be nearly uniform. Since many incoherent beams are superposed, strong interference occurs among beams. Phases and directions of rays are randomly perturbed. If the superposed beams just hit an object at the single point, the power uniformity would be maintained. When the once-uniformed (homogenized) beam further propagates in space, random phases and random directions deprive the beam of uniformity. The beam splitting/superposing method is unsatisfactory with regard to isophase, parallelism and perpetual uniformity which are important conditions of homogenized beams.

(2) A Two Lens Method Having a Set of an Intensity-modifying Lens and a Phase-adjusting Lens ① U.S. Pat. No. 3,476,463(Justin L. Kreuzer) proposed homogenizing optics including an intensity-modifying aspherical lens L1 with a concave center and a convex periphery and a phase-adjusting aspherical lens L2 which has a surface complementary to the intensity-modifying lens L1. The intensity-modifying lens L1 expands central strong rays of a Gaussian beam by the concave center and concentrates peripheral weak rays into a uniform power distribution by the convex portion. At the forefront of the phase-adjusting lens L2, energy density of rays per unit area is uniform. Although the intensity distribution is uniform, phases and directions are irregular for the rays. The phase-adjusting lens L2 restores a common plane-wave phase and parallelism of the rays. The rays after the phase-adjusting lens are parallel, coherent (common phase), and uniform in a power density.

The phase-adjusting lens L2 is convex at a center and plane at a periphery. L2 has a surface of thickness distribution complementary to the intensity-modifying lens L1. The beam after passing the phase-adjusting lens L2 is a coherent, parallel, uniform power distribution beam. Namely, all individual rays are parallel, in-phase (coherent), monochromatic and isopower (uniform density of power). Parallelism and coherency ensure a constant energy density and a definite section of the propagating beam along an overall light path. It is an ideal tophat beam.

① obtained thickness distribution functions of the rear surface of the intensity-adjusting lens L1 and the front surface of the phase-adjusting lens L2 for realizing a tophat beam by analytical calculations without approximation. If the intensity distribution of a laser beam is known, full surface shapes of the lenses L1 and L2 can be determined by analytical calculation. ① was an excellent work for tophat optics. ① can make a tophat beam with a uniform energy density within a definite area. But there were still some drawbacks in ①. It cannot enlarge or reduce a size of a tophat beam. The size of the final tophat beam is uniquely determined by the lenses L1 and L2. Another drawback exists in the tophat itself. A tophat function (two-dimensional step function) has sharp discontinuity at edges. The tophat function is indifferentiatable at the edges. Succeeding propagation perturbs ray phases and ray directions, which degenerates a tophat power distribution.

② Japanese Patent Laying Open No.10-153750, "LASER BEAM SHAPING OPTICAL PARTS" proposed a two-lens system which makes a tophat power distribution beam from a Gaussian beam and enables a tophat image to enlarge or reduce at any magnification/reduction ratio. The system lays an intensity-modifying lens in front and a phase-adjusting lens at the back similar to ①. Probability of magnification/reduction demanded ② to sacrifice parallelism and coherence (isophase) of a final beam. Rays in the beam after the phase-adjusting lens are not parallel. Ideal surface shape (thickness distribution) functions can analytically calculate no more.

Then, ② obtained approximate solutions of lens shape functions by assuming trial lens thickness functions L1(r) and L2(r), calculating amplitudes and phases at surfaces of two lenses by waveoptical manner, examining whether the amplitude and the phase at the rear surface of the second (phase-adjusting) lens are constants, modifying the trial thickness functions for reducing amplitude and phase discrepancies and repeating similar steps many times. Iteration produces approximate solutions of lens shape functions which gives a parallel, isophase(coherent) tophat beam at the rear surface of the phase-adjusting lens. Unlike geometric optics, waveoptic calculation is unidirectional which prohibits reverse calculation seeking for a favorable lens shape functions from final condition of parallelism, isophase of the beam. Iterations of calculations and examinations lead to an adequate set of solutions. Unidirectional waveoptical calculations make plenty of candidate solutions. An optimum set of solutions should be chosen from many candidate solutions by a predetermined criterion.

Waveoptical iterations require a vast amount of calculations. Use of high performance computers can minimize the time of calculations. The reason why many solutions appear in ② is because the phase-adjusting lens cannot remedy wave components perfectly in phase unlike ①. ① required a perfect isophase solution which ensured uniqueness of a solution. Since ② abandons the isophase and parallelism requirements, many candidate solutions appear in ①.

The reason why many solutions are generated is that the calculations are directed from assumed lens thickness distribution to intensity distribution on the rear surface of the lens. Plenty of solutions are yielded in accordance with the assumption of the lens shape. ① is an analytical exact method. ② is an empirical method based on computers. Both try to produce tophat beams by an assembly of an intensity-modifying lens and a phase-adjusting lens. ① can obtain a unique solution. But fabrication of the lens is not easy, since the object lens is an aspherical lens.

③ Fred M. Dickey, Scott C. Holswade, "Gaussian laser beam profile shaping", Optical Engineering, Vol.35, No.11, November 1996, p3285–3295.

This document proposed a method of varying a Gaussian beam into a uniform power beam in a definite area by a set of two or three lenses. ③ alleged that some sets of lenses can make a tophat beam from a Gaussian one.

④ Frank Wyrowski, "Diffractive optical elements: iterative calculation of quantized, blazed phase structures", J. Opt. Soc. Am. A, Vol.7, No.6, June 1990, p961–969.

This document proposed a contrivance of diffracting a laser beam by a DOE for making a series of letters, for example, "UNI ESSEN FRG" on an image plane.

⑤ Japanese Patent Laying Open No.2002-202414, "BEAM TRANSDUCER ELEMENT, ILLUMINATION OPTICAL SYSTEM USING THE BEAM TRANSDUCER ELEMENT, ALIGNER, LASER PROCESSING MACHINE AND PROJECTION DEVICE".

This document proposed optics of converging a Gaussian beam to a uniform (tophat) beam by two holographic elements.

⑥ Japanese Patent Laying Open No.9-61610, "BINARY OPTICS, AND LIGHT CONVERGENCE OPTICAL SYSTEM AND LASER MACHINING DEVICE USING BINARY OPTICS".

This document suggested a contrivance of shaping a Gaussian beam to a uniform distribution beam (tophat) by diffractive optical elements.

⑦ U.S. Pat. No. 6,433,301 (Dunsky et al.), "BEAM SHAPING AND PROJECTION IMAGING WITH SOLID STATE UV GAUSSIAN BEAM TO FORM VIAS".

This patent converts a Gaussian beam into a tophat beam by a DOE, converges the tophat beam and irradiates objects with the converged tophat beam for boring or other processing. The tophat beam is guided to the objects via a converging lens for heightening power density.

The above laser processing techniques aim at making a tophat (uniform power) beam from a Gaussian laser beam by DOEs or lenses, separating one tophat beam into a plurality of tophat beams, irradiating multipoints on an object with the plural tophat beams, and cutting, boring, annealing or welding the object at the multipoints. It is still insufficient to produce a tophat beam at one time or at a spot. Beams should be maintained to be the tophat power distribution at all times and at all positions. The cited references do not always succeed in keeping uniform power distribution of beams throughout the light paths.

A homogenizer lens or a homogenizer DOE converts a Gaussian beam into a tophat beam at a predetermined spot. But the beam further propagates in space after passing a homogenized spot. Spatial propagation perturbs phases and directions of rays, unless the homogenized beam is fully a monochromatic, coherent, parallel beam.

The aforedescribed ②, which is based upon waveoptical calculations of trial and error, can produce many approximate solutions but cannot obtain a decisive solution. Although a uniform density beam is once established at a point by a DOE based upon the approximate solution, the uniform power density profile degenerates in propagation. Since the non-uniform beam is divided by a DOE, divided beams are degraded into non-uniform branched beams.

The reason is that the intensity distribution at the point has too sharp edges, the inventor of the present invention supposes. And the sharp intensity discontinuity at the edges may cause diffraction after the point, so that the intensity is in disorder.

So, the inventor adopts a supergaussian intensity distribution with gradual edges as a distribution of an object beam, instead of the tophat distribution (f=1 at r≦a, f=0 at r>a). A Gaussian function has $r^2$, which is in proportion to the square of a radius r, in exp( ), but a supergaussian function is in proportion to the nth power of a radius r. The supergaussian distribution is $\exp\{-2(r/a)^n\}$.

N is the order number of the supergaussian function. When n=2, it is equal to a Gaussian function. When n is indefinitely large, it is a tophat function. A definite number of supergaussian functions ensures continuity and differentiatablity at edges. There is a big abyss between a definite number and an indefinite large number. A tophat beam soon loses a uniform beam shape by propagation. The inventor hit a hint of smoothing edges by employing a definite number (n=20–100) of the supergaussian function for a beam shape for avoiding the beam shape degradation in propagation.

The inventor gives an improvement of replacing a uniform, tophat beam by a quasi-uniform supergaussian beam having the same size. The sectional shapes are arbitrary. The present invention produces a cylindrical supergaussian beam instead of a round tophat beam. Alternatively, the present invention makes a rectangular supergaussian beam instead of a rectangular tophat beam. A 2a×2b supergaussian beam can be represented by $\exp\{-2(x/a)^m-2(y/b)^n\}$. An ellipsoidal supergaussian can be represented by $\exp[-2\{(x/a)^2+(y/b)^2\}^n]$. Supergaussian order numbers are m and n. A sectional shape is 2a×2b. Regions within r<a (round beam) or within |x|<2a, |y|<2b (rectangle beam) are called a uniform region.

A lens can convert a Gaussian power distribution laser beam into a uniform tophat beam. A spherical shaped lens is incompetent. An aspherical lens should be utilized for reforming a Gaussian distribution laser beam into a uniform distribution tophat beam. Fabrication of such an aspherical lens is not easy. The aspherical lens is a high cost optical part, since it takes long time for making the aspherical lens.

A lens homogenizer can be made by an aspherical lens. A lens has smoothly curving surfaces. The height of surfaces changes continuously and smoothly as a continuous function of a radius coordinate "r". What a lens can do can be done by a DOE. The lens for homogenizing can be surely replaced by a DOE. There is possibility of a "homogenizing DOE".

DOEs are classified into reflection type DOEs and penetration type DOEs. Principles are common. Here, having an analogy to a lens, the penetration type DOEs are considered. This invention can be built with the reflection type DOEs, of course. A penetration type DOE is an assembly of pixels aligning in x- and y-directions. A pixel is a fundamental square cell having a definite size. A pixel has a free parameter which is a height or a thickness. The thicknesses (or heights) are quantized into discrete 16 values or 32 values.

For example, convex lenses or concave lenses can be replaced by Fresnel lenses having a plenty of concentric circular protrusions with a quasi-uniform thickness. A Fresnel lens is inherently an analog optical device. Heights and diameters of the protrusions are continuous variables in the Fresnel lens. A Fresnel lens can be reduced to a DOE (diffraction optical element) by replacing analog variables by digital ones and continuous areas by discrete pixels. Namely, a convex lens or a concave lens can be replaced by an identical DOE. Similarly, a homogenizing lens can be also replaced by a homogenizing DOE.

Instead of an aspherical lens, a special DOE can homogenize a Gaussian laser beam to a uniform power (tophat) beam. Furthermore, another special DOE would be able to homogenize a Gaussian beam into a supergaussian beam (n is several tens).

The present invention has interest in an optical system of homogenizing a laser Gaussian beam into a supergaussian beam with a DOE. Not a homogenizing DOE but a DOE homogenizing optical system is an object of the present invention. Thus, an actual structure of the homogenizing DOE is not described in detail in the specification.

Assuming that such a homogenizing DOE could be made, probable problems are now clarified. Unlike a lens homogenizer, a DOE homogenizer builds a quasi-uniform distribution by dividing a beam into a plurality of rays, diffracting rays, assembling rays and superposing rays in accordance with some rule. In the case of a lens homogenizer, the quasi-uniform distribution plane exists just at a front surface of an phase-adjusting lens. Similarly, a DOE homogenizer builds a quasi-uniform distribution plane at a point distanced from the DOE by a certain length. The quasi-uniform plane is called a "reference plane".

The homogenized beam is then divided into a plurality of branched beams dispersed lengthwise and crosswise by a diverging DOE (diffractive optical element). The branched beams are converged by a lens and irradiated to many object spots aligning at definite intervals on an image plane (object plane).

Such an optical system consists of a homogenizer DOE, a diverging DOE, a lens and an object (an object plane).

A beam can be divided into an arbitrary number of beams by a diverging DOE. If the division number were large, the size of a single beam projected on an image plane would be too narrow, which would obscure details of the beam. Then three to five divided beams have been made by a diverging DOE for examining power intensity distribution in the beam spots in detail. As a result, power density fluctuates in three to five homogenized beams spatially which should have uniform intensity distribution. Such a large power distribution would degrade the resultant divided beams as a tophat (or supergaussian) beam.

What is the reason of causing the big fluctuation? A homogenizing DOE makes a uniform power density beam at the reference position. Noise rays occur at peripheries of the beam. Noise is caused by unnecessary diffraction by the DOE. The homogenizer DOE generates various order of diffraction rays. The noisy diffraction rays are also diffracted further by the diverging DOE and are projected onto the image plane. Interference between noise and signals causes power fluctuation of the once-homogenized beams.

The consideration clarifies the reason of inducing the fluctuation of the branched beams.

Then, the inventor inserted an aperture mask at the reference position (focal point of the DOE) for killing noise. The aperture mask is a plate having a window of a size (diameter 2c or sides 2c×2d). The inventor tried to examine an effect of a narrow aperture mask having a window narrower than the beam size, since he thought the edges of the beam induced the fluctuation. For a round beam (2a), a round window (2c) smaller than the beam was tentatively perforated (2a>2c) on the aperture mask. For a square beam (2a×2b), a square window (2c×2d) smaller than the beam was tentatively perforated on the mask(2a>2c, 2b>2d).

The reason why the aperture mask is placed at a reference position is that the beam is homogenized at the reference position. The reference position is a focal point of the homogenizer DOE. The lens produces an image of the aperture mask on the image plane.

The aperture mask eliminates some portion of the beam or the noise. The window of the aperture mask determined the shape of the beam.

The homogenizer optics system makes a uniform power density beam by a homogenizer DOE at a reference position, annihilates annular edge parts of the beam by an aperture mask at the reference position, divides the edge-cut beam into a plurality of beams by a diverging DOE, converges the divided beam by a lens and irradiates a plurality of object spots with the divided beams for heating and lightening processing. The lens can be an ordinary ftanθ lens or a sophisticated fsinθ lens. The fsinθ lens enables plural separated beams to produce irradiated spots aligning at a definite period.

The homogenizer optic system can simultaneously achieve boring, welding, annealing, cutting or do other optical/thermal processing of many spots or many lines in parallel. In addition to two-dimensionally distribution round spots, the homogenizer system can accomplish similar processing on many parallel lines. Lines are a limit of increasing a vertical/horizontal ratio of a rectangle. Lines can be treated in a manner similar to spots. In the case of linear objects, a homogenizer DOE of making a homogenized rectangle beam of a high ratio a/b and a diverging DOE of inducing one-dimensional diffraction should be employed.

Some kinds of heat/light processing require uniform power distribution on many object points. Equipollence of power is important for ensuring same quality of processing on all the points. Individual object spots require spatial uniformity of power density without fluctuation. Such an elaborate processing requires two different steps of uniformity. One is allover uniformity among plural object points. The other is individual uniformity within individual object spots.

Figure 1:
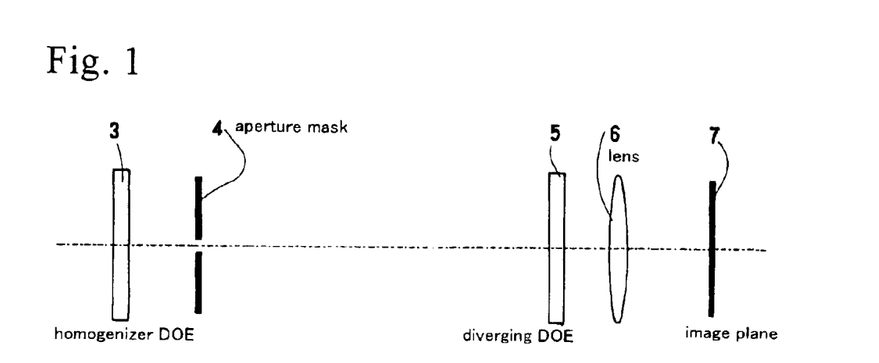
FIG. 1 is a schematic view of a multipoint homogenizer system of the present invention including a homogenizer DOE, an aperture mask, a diverging DOE, a lens and an image plane.

The abovementioned optics simply consists of a homogenizer DOE 3, an aperture mask 4, a diverging DOE 5, a lens 6 and an object (image plane) 7, as shown in FIG. 1. A quasi-uniform, supergaussian beam is produced at the aperture mask 4. The diverging DOE 5 divides the beam into a plurality of branched beams. The branched beams are converged and irradiated onto many object spots on the image plane 7. The lens 6 produces an image of the aperture mask 4 on the image plane 7.

The above mulitipoint lump homogenizer system has still a problem to be solved. The problem is now clarified.

The beam should have quasi-uniform power distribution within a radius a which is represented by the supergaussian function $\exp\{-2(r/a)^n\}$. If a narrow aperture mask of a 2c diameter (2c<2a) is placed at the focus, the aperture mask eliminates edge parts (c<r<a) of the beam. Intensity vehemently fluctuates at the edge (r=a). If the edges are annihilated by the mask, good inner parts remain. When the good parts are diffracted onto an image, good diffracted beams would be obtained.

But, it is not true. The fact is that the edge-eliminated good beam makes separated beams which have large power fluctuation on the image plane. Since the edge parts c<r<a are eliminated, the power uniformity in a beam is heightened at the position of the aperture mask. But the beam propagates further in space. Sharp cut edges induce strenuous diffraction which causes vehement power fluctuation of the branched beams on the image plane and degenerate supergaussian distribution.

SUMMARY OF THE INVENTION

The present invention proposes a multipoint lump homogenizing optical system including a homogenizer DOE for converting a Gaussian laser beam into a uniform power density beam at a reference position, an aperture mask having a window wider than a homogenized beam and being laid at the reference position, a diverging DOE for branching the homogenized beam into a plurality of beams, a lens for converging the branched beams and an image plane (object plane). The gist of the present invention is a requirement that the window of the aperture mask should be wider than a beam section. Ordinary masks are used to cut edge parts for eliminating surging edge power. The present invention denies such a conventional narrow aperture mask and recommends the wide aperture mask allowing beam edge power to pass therethrough. This invention denies a non-aperture mask system. Without an aperture mask, final beams would suffer from noise.

When the homogenized beam is a circular-sectioned beam of a diameter 2a, the aperture mask has a window with a diameter 2c which is larger than 2a (2c>2a). When the homogenized beam is a rectangle-sectioned beam of sides 2a×2b, the aperture mask has a window having sides 2c×2d which are larger than 2a×2b (2c>2a, 2d>2b).

Lower limits of the aperture mask window are determined. Upper limits of the window should be restricted not to include noise. Noise appears at peripheries distanced from the beam main parts. Positions of noise occurrence depend upon the homogenizer DOE. Noise first appears within twice of the beams size in general. The upper limits of the mask window are given by the above consideration.

When the homogenized one is a round-section beam with a diameter "2a", the diameter "2c" of the window of the aperture mask should satisfy an inequality, 2a<2c<4a.

When the homogenized one is a rectangular-section beam with sides of "2a×2b", the sides "2c×2d" of the window of the aperture mask should satisfy inequalities, 2a<2c<4a, 2b<2d<4b.

Figure 20:
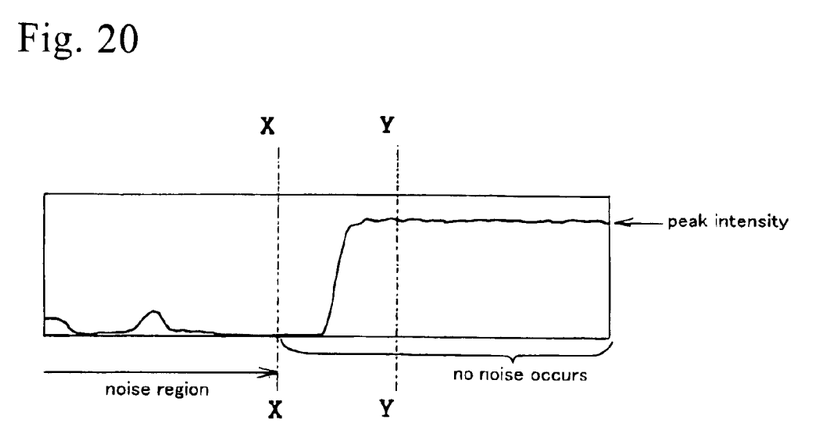
FIG. 20 is an enlarged intensity graph of an edge part of the homogenized beam enclosed by a dotted line rectangle in FIG. 19.

Upper limits 4a and 4b are valid for a case having noise at far distant peripheries beyond the window. In many cases, higher order diffraction noise appears at peripheral parts closer than 4a or 4b at the position of the aperture mask. The beam sizes 2a and 2b should be restricted within a central noiseless region (FIG. 20). If an innermost point of the noise regions is denoted by D1 and D2. Inequalities should rigorously be expressed by 2a<2c<D1<4a, 2b<2d<D2<4b.

The present invention proposes a laser processing apparatus which includes a homogenizer DOE, an aperture mask, a diverging DOE, a lens, and an image plane (object plane). The present invention can be applied to all thermal/light processing high power lasers.

For example, $CO_2$ laser wavelength 9 μm–11 μm.

Solid state laser wavelength 200 nm–1100 nm.

DOEs are classified into a reflective type and a transparency type. This DOE is a transparency one. The DOE should be made of a material transparent to the object wavelength. For 10.6 μm of a $CO_2$ laser, a DOE and lens should be made of ZnSe. In the case of 532 nm of the second harmonic of a YAG laser, a DOE and lens should be made of e.g., silica ($SiO_2$).

The aperture mask, which is opaque to the object wavelength, is made of a metal or a ceramic.

Unlike ordinary aperture masks, the aperture mask of the present invention does not shield a beam but only shields outer noise. It is not easy to understand the principle and function of the aperture mask of the present invention. Of course, several embodiments will be described later for showing effects of the aperture mask. Basic functions are clarified before embodiments by referring to FIGS. 19 and 20.

Figure 19:
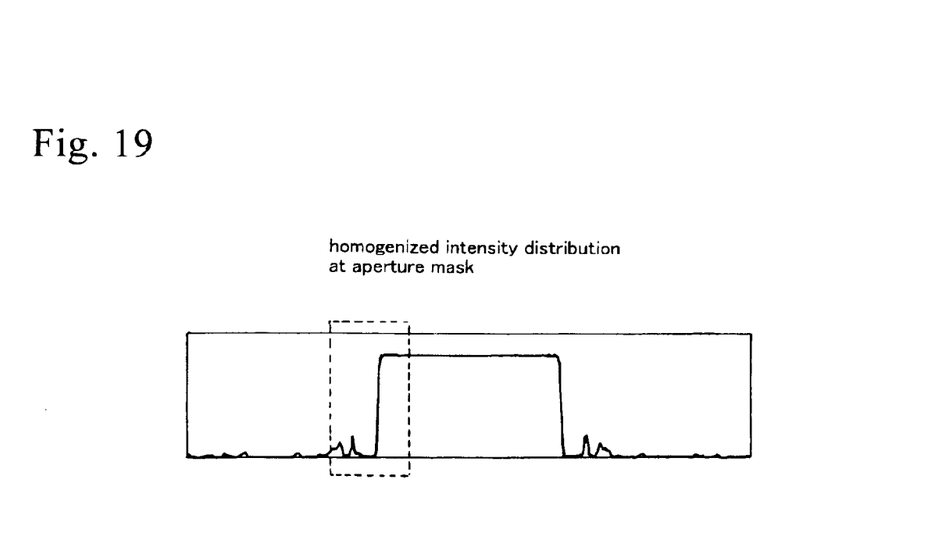
FIG. 19 is an intensity graph of a homogenized beam with a central plateau and peripheral noise at an aperture mask.

FIG. 19 shows an example of on-x-axis beam power distribution of a DOE-homogenized beam at an aperture mask. The power graph has a central wide plateau with a 2a diameter. 2a is deemed to be a diameter of the beam. X=±a are edges of the beam. The homogenized central plateau results from first order diffraction. The graph has small noise at the outside of ±2a edges. Since the beam has been homogenized by a DOE, noise accompanies peripheries of the beams. Noise originates from second order, third order or other higher order diffraction of the DOE.

FIG. 20 is an enlarged graph of a dotted-line enclosing edge part of the power distribution in FIG. 19. In FIG. 20, a right part of a vertical line X—X is an edge and a uniform plateau. A left part of line X—X is a noise dispersing region. Weak light power contained in noise exists outside the uniformed plateau at the aperture mask position. Since the homogenized beam further propagates and branches, noise components superpose on and mix in the neighboring uniform plateaus. Mixing and interfering of noise degrade coherence and quality of divided uniform power plateaus.

If we obeyed an ordinary, common sense of masks, a mask having a narrow window which shields an inner part of line Y—Y in FIG. 20 would be employed. The inner part within the Y—Y line is neatly uniform and immune from noise. The present invention, however, employs a wider aperture mask which only shields the noise dispersing region outside the line X—X contradictorily to the common sense. A purpose of positioning the wide aperture mask is to eliminate noise which is generated by higher order diffraction. Once noise is removed, probability of invasion of noise into main beam plateau parts is permanently eliminated. Main parts are protected from disturbance by noise. An optimum diameter of an aperture depends upon the homogenizing DOE. The aperture mask should not cut a part of the main plateau but should remove noise. The edge of the window (aperture) should coincide with the X—X line. The size of the aperture should be determined by the side of the plateau and the noise region. The window should be smaller than the peripheral noise region but larger than the central plateau (=beam size). The upper limit of the window is restricted by the noise region. But the size of the noise region cannot be defined in general, because appearance of noise has strong dependence on DOEs. The maximum of the upper limits is about twice of the beam size. Thus the window sizes 2c and 2d should satisfy 2a<2c<4a and 2b<2d<4b, where 2a and 2b are sizes of the homogenized beam.

If a narrower aperture mask were used according to the common sense instead of the wider aperture mask, the narrower mask would shield an edge part left beyond Y—Y line in FIG. 20. The edges are not an unnecessary portion but a necessary portion. Elimination of the edge parts makes bad influence upon the following beam propagation by perturbing phases and directions. Preservation of the edge parts maintains entity of the beam. As aforementioned, a tophat beam with edge discontinuity is suffering from turbulence of intensity in proceeding propagation. Although a tophat (f=1, r≦a, and f=0, r>a) beam seems to be the most suitable, the edge discontinuity would induce strong random diffraction which degenerates uniform power beam profile.

The present invention chooses better a supergaussian beam than a tophat beam for reducing diffraction by edges and for avoiding beam perturbation. If a narrow aperture mask were used, the aperture mask would cut the supergaussian edge which is an important matter for suppressing excess edge diffraction. The narrow aperture mask would negate the choice of supergaussian. This is the reason why the present invention prefers a supergaussian beam to a tophat beam. Later, experiments will actually clarify an appearance of strong overshoots at edges in use of a narrow aperture mask. Therefore, the present invention adopts a wider aperture mask having a window whose side coincides with X—X line in FIG. 20. The window shields noise but admits edge rays.

Definitions are given to some terms which are necessary to understand succeeding descriptions.

[Note 1: Diffraction efficiency of homogenizer DOE (FIG. 18)]

Figure 18:
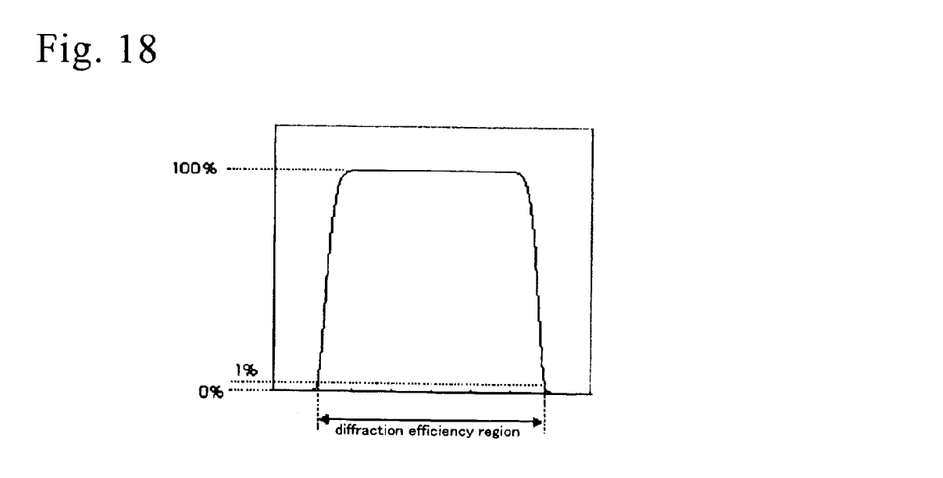
FIG. 18 is a model intensity graph of a homogenized beam within a diffraction efficiency region for showing a definition of homogenizer diffraction efficiency.

The diffraction efficiency of the homogenizer DOE is a rate of an area of 1%–100% of the diffracted beam intensity to the largest intensity (100%) in FIG. 18.

[Note 2: Uniformity of divided beam intensity of diverging DOE]

The uniformity upper limit and uniformity lower limit of the diverging DOE are defined in terms of average intensity, the largest intensity and the smallest intensity by the following equations, $$\frac{\text{The uniformity}}{\text{upper limit}} = \frac{(\text{the largest intensity} - \text{average intensity})}{\text{average intensity}} \times 100\%$$

$$\frac{\text{The uniformity}}{\text{lower limit}} = \frac{(\text{the smallest intensity} - \text{average intensity})}{\text{average intensity}} \times 100\%.$$

[Note 3: The largest noise intensity ratio of diverging DOE]

The largest noise intensity ratio is defined as a rate of the largest noise to average beam intensity of divided beams.

[Note 4: Uniformity of divided beam intensity of homogenizer DOE]

The uniformity upper limit and uniformity lower limit of the homogenizer DOE are defined in terms of average intensity, the largest intensity and the smallest intensity by the following equations, $$\frac{\text{The uniformity}}{\text{upper limit}} = \frac{(\text{the largest intensity} - \text{average intensity})}{\text{average intensity}} \times 100\%$$

$$\frac{\text{The uniformity}}{\text{lower limit}} = \frac{(\text{the smallest intensity} - \text{average intensity})}{\text{average intensity}} \times 100\%.$$

The present invention proposes a multipoint lump homogenizing optical system of converting a non-uniform (Gaussian) laser beam into a quasi-uniform supergaussian beam by a homogenizer DOE, annihilating noise portions by a wide aperture mask with a window wider than a beam section, dividing the beam into a plurality of beams by a diverging DOE, converging the divided supergaussian beams by a lens, and irradiating object spots on an image plane with converged supergaussian beams. There is no prior art making the supergaussian beam by a DOE. This invention is novel at the use of the DOE for homogenizing the Gaussian beam into the supergaussian one.

Unlike a lens, a DOE induces higher order diffraction rays, which perturb uniformity of branched beams. The present invention places an aperture mask with a window larger than the homogenized beam for not shielding peripheral noise but maintaining edge power of the beam. The aperture mask has a function of exploiting advantages of supergaussian beams and excluding noise. The branched beams produced by the diverging DOE are immune from intensity fluctuation, overshoots or surges at edges. The present invention enjoys conspicuous advantages only by placing a wide aperture mask at the focus of the homogenizer.

DETAILED DESCRIPTION OF THE PREFERRED EMBODIMENTS

Embodiment and Comparison Examples having the YAG second harmonic (532 nm) as a light source are described. Embodiment places an aperture mask with an window which is slightly wider than a size of a homogenized beam at a focal point of a homogenizer DOE. An aperture mask admits all the homogenized beams to pass but shields peripheral noise.

Comparison Example 1 does without an aperture mask. Comparison Example 2 adopts an aperture mask with a window narrower than Embodiment at a focal point of the homogenizer DOE. Comparison Example 2 admits noise to pass. Comparison Example 2 shields peripheral portions of the homogenized beam.

[1. Embodiment (aperture mask with a window slightly wider than a beam; FIGS. 4–11)]

Figure 2:
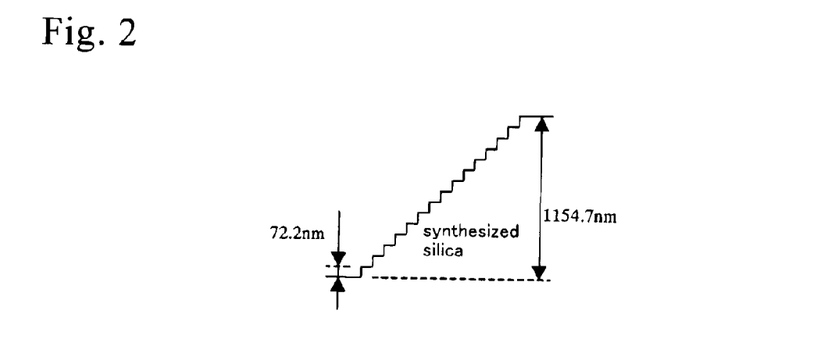
FIG. 2 is a diagram of a sixteen step variation of thickness of the homogenizing DOE and the diverging DOE. One step has a height of 72.2 nm. A total height of sixteen steps is 1154.7 nm=0.1547 μm. The DOEs are made of synthesized silica ($SiO_2$).
Figure 5:
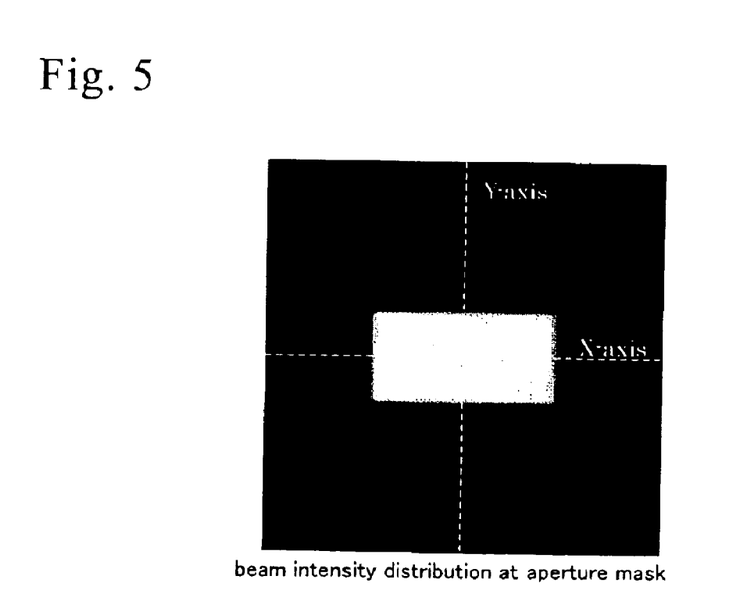
FIG. 5 is a power intensity distribution of a 1.2 mm×0.6 mm sectioned supergaussian beam homogenized by a homogenizer DOE at the aperture mask.

1. Laser beam (at an input position to a homogenizer DOE)
   Wavelength: λ=532 nm (Second Harmonic of YAG laser)
   Beam diameter: 2 mmφ
   Divergence angle: 0 mead(parallel beam)
   Mode: $TEM_{oo}$
2. Homogenizer DOE
   Diffraction efficiency: 95.92%
   Pixel size: 5 μm×5 μm
   Phase difference steps: 16 steps (steps are shown in FIG. 2)
   Pixel number: 800 pixels×800 pixels
   Substrate material: synthesized silica ($SiO_2$) refractive index n=1.46 for λ=532 nm
   Substrate size: 50 mmφ×5 mmt
   Focal length: 70 mm (FIG. 5 shows beam intensity distribution at focus)
   Homogenized beam shape: 1.2 mm($1/e^2$ attenuation)×0.6 mm ($1/e^2$ attenuation)
   Uniform region: 1.0 mm×0.5 mm
   Supergaussian orders: m=30, n=30
   AR coating on both surfaces: more than 99% of transparency
   (2a=1.2 mm, 2b=0.6 mm, m=30, n=30, $f_1$=70 mm, h=16)
3. Aperture mask
   Window size: 1.365 mm×0.735 mm
   (2c=1.365 mm, 2d=0.735 mm: a<c and b<d)
4. Diverging DOE
   Diffraction efficiency: 67.5%
   Uniformity: upper limit +0.71%, lower limit −1.18%
   Strongest noise ratio: 5.8% (to average signal power)
   Phase difference steps: 16 steps (same as FIG. 2)
   Pixel size: 5 μm×5 μm
   Unit pattern pixel number: 32 pixels×32 pixels Substrate material: synthesized silica (n=1.46 for λ=532 nm)

Substrate size: 50 mmφ×5 mmt

Bifacial AR coating: more than 99% of transparency

Branch number: three

Branch pitch: 0.321 mm pitch (at $f_2$=80 mm)

Divided beam spot size: 0.24 mm($1/e^2$attenuation)×0.12 mm($1/e^2$attenuation)

5. Lens

Focal length: $f_2$=80 mm

Effective diameter: 25 mmφ

Substrate material: synthesized silica ($SiO_2$) (n=1.46 at λ=532 nm)

Substrate size: 30 mmφ×3 mmt

Reduction ratio: −1/5

6. Optical parts configuration

Figure 3:
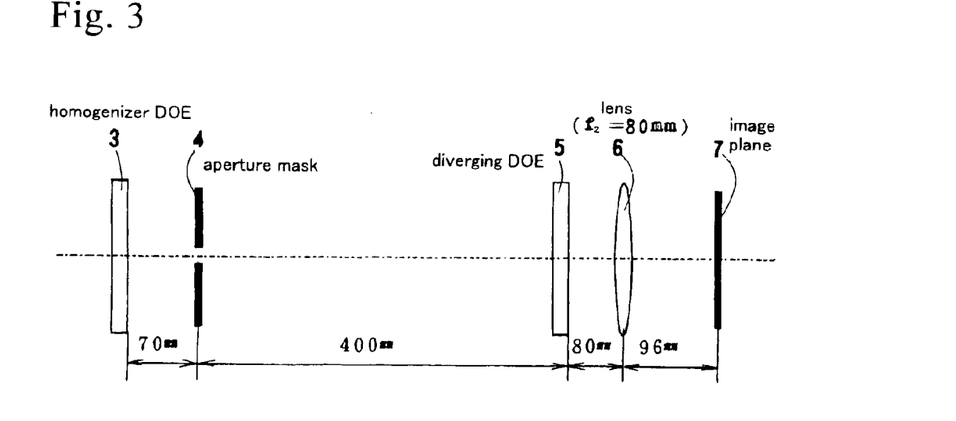
FIG. 3 is a schematic view of a multipoint homogenizer system of an embodiment including a homogenizer DOE, an aperture mask, a diverging DOE, a converging lens and an image plane which are distanced from each other by 70 mm, 400 mm, 80 mm and 96 mm. The converging lens has a 80 mm focal length.

Optical parts are aligned in series on an axial beam line as shown in FIG. 3. The distance between the homogenizing DOE 3 and the aperture mask 4 is 70 mm. The diverging DOE 5 is separated from the aperture mask 4 by 400 mm. The lens stands behind the diverging DOE 5 with a distance of 80 mm. The image plane (object plane) 7 are settled at the back of the lens 6 at an interval of 96 mm.

A YAG laser oscillates at a wavelength of 1.06 μm. The object process here requires a shorter wavelength processing beam. Then the second harmonic wavelength λ=532 nm of the YAG laser is employed as a processing beam. Since 532 nm is visible light, silica lenses and silica DOEs are available for optical parts. Examples make use of synthesized silica of n=1.46 as a material of transparent optical parts. A full 16 step height should correspond to a single wavelength path difference in DOEs. A single step has a height "h". A wave number difference induced by a step is λ/h(n−1). One step has a height of 72.2 nm. A full 16 step height is 1154.7 nm=1.1547 μm. The large step difference height results from the small refractive index (n=1.45) of silica.

This invention can be applied to all strong power lasers; $CO_2$ lasers, excimer lasers in addition to YAG lasers. A $CO_2$ laser emits infrared (λ=10.6 μm) light. In the case of a $CO_2$ laser apparatus, lenses and DOEs should be made of zinc selenide (ZnSe) which is transparent for infrared. ZnSe has a high refractive index n=2.4, which is larger than silica's n=1.46. But a single step height λ/h(n−1) of ZnSe DOEs is larger than visible light silica DOEs, because too long λ cancels a thinning effect caused by high n.

The laser beam, which is a set of exactly parallel rays, is a 2 mmφ ($1/e^2$ attenuation) beam parallel to the optical axis α-axis) just before the homogenizer DOE. In this description, rays mean individual light components of a beam. Edges of a beam are defined at lines at which light power density attenuates down to $1/e^2$ (=1/7.4) of the maximum power density.

The homogenizer DOE (Diffraction Optical Element) includes 800 pixels×800 pixels in xy-plane. A single pixel has a cell size of 5 μm×5 μm. The total size of the homogenizer DOE is 4 mm×4 mm. A silica substrate of 50 mmφ×5 mm thickness has prepared as a substrate for the DOE. A fine convex/concave pixel structure is processed at a center of the 50 mmφ silica substrate. The homogenizer DOE focal length f, means that the DOE has a function of converging rays at the aperture mask. DOEs are classified into two categories. One type is Fraunhofer type (or Fourier type) DOEs which lack convergence power and produce an image at an indefinitely long distance. The other type is Fresnel type DOEs which have a definite focal length. The homogenizer DOE adopted here is a Fresnel type DOE having a converging function of a convex lens of $f_1$.

This homogenizer converts a round section beam into a rectangular section beam. A supergaussian function of the round/rectangle converting homogenizer can be represented by $\exp\{-2(x/a)^m - 2(y/b)^n\}$. 2a and 2b are side lengths of the beam section rectangle. The example homogenizer tries to produce a rectangle supergaussian beam having a size of 2a=1.2 mm and 2b=0.6 mm. Peripheries (x=±a, y=±b) of a beam are determined to be the spots having power density as small as $1/e^2$ times of the central value. The present invention takes a value between m=20, n=20 and m=100, n=100 for a supergaussian order parameter m. Here, this example chooses m=n=30 for a supergaussian parameter m, n. The size of a uniform power region is assumed to be 1.0 mm×0.5 mm.

When a DOE (diffraction optical element) is made of silica ($SiO_2$) having a refractive index n=1.4, a reflection loss of $|(n-1)/(n+1)|^2$ is not negligibly small. Antireflection films are formed on both surfaces of the homogenizer DOE for inhibiting the laser beam from being reflected on the front surface and the rear surface. This example succeeds in heightening transparency up to more than 99% by producing the AR coating on both surfaces.

The window of the aperture mask is a rectangle of 2c×2d=1.365 mm×0.735 mm. The supergaussian beam has a section of 2a×2b=1.2 mm×0.6 mm at the aperture mask. 1.365 mm>1.2 mm. 0.735 mm>0.6 mm. Thus, the aperture mask window is wider than the supergaussian laser beam (2c>2a, 2d>2b). There is a margin of about 0.1 mm between the beam section and the window.

The aperture mask does not obstruct the peripheral portion of the homogenized beam in contrast to ordinary masks. The homogenized beam is not disturbed by the aperture mask. This is an important matter in the present invention. As aforementioned, an aperture mask is requisite for the present invention. However, the present invention requires not an ordinary narrow aperture mask which cuts outer parts of a beam but a wider aperture mask which allows the whole beam to pass. Why is such a wide aperture mask which cuts no part of the beam required? It is an important question, which will be answered later.

The diverging DOE is made of synthesized silica (SiO2) in the example. The DOE has a 50 mmφ diameter and a 5 mm thickness (50 mmφ×5 mmt). The total size and pixel size of the diverging DOE are common with the homogenizer DOE. The homogenizer DOE has no unit pattern. But, the diverging DOE has many equivalent unit patterns. Repetitions of unit patterns in x- and y-directions build the diverging DOE.

In the diverging DOE, a period Λ of a unit pattern is 32 pixels×32 pixels.

A side Λ of a unit pattern is 160 μm×160 μm (160 μm=5 μm×32 pixels). An effective region of the diverging DOE is 800 pixels×800 pixels=4 mm×4 mm, which is common with the homogenizer DOE. This DOE (4 mm×4 mm) contains 25×25=625 unit patterns. Namely, a unit pattern includes 1024 pixels. A diverging DOE includes 625 unit patterns. A DOE includes 640000 pixels. The spatial period Λ determines diffraction angles ($\sin\theta = m_j \lambda / \Lambda : m_j$ is a diffraction order parameter (integer)).

The diverging DOE is also bifacially antireflection(AR)-coated. The branching number is three. The branching pitch is 0.321 mm on the image plane ($f_2$=80 mm). Since this is only a trial experiment, the branching number is so small. In practical applications, the DOE branching number should be equal to the number of processing spots which align two-dimensionally on the image plane. The branched beams have also rectangle sections of 0.24 mm×0.12 mm.

The lens reduces the beam size at a reduction rate of 1/5 of the size at the aperture mask. A mask/lens distance is denoted by "s". A lens/image distance is denoted by "t". The lens formula requires $s^{-1}+t^{-1}=f_2^{-1}$ ($f_2$=80 mm). The 1/5 reduction rate means t/s=1/5. A solution is s=480 mm, t=96 mm, which are shown in FIG. 3.

The convergence lens is made of similar synthesized silica. The silica-made diverging DOE (30 mmφ×5 mmt) has an effective diameter of 25 mmφ and a focal length $f_2$=80 mm.

Figure 4:
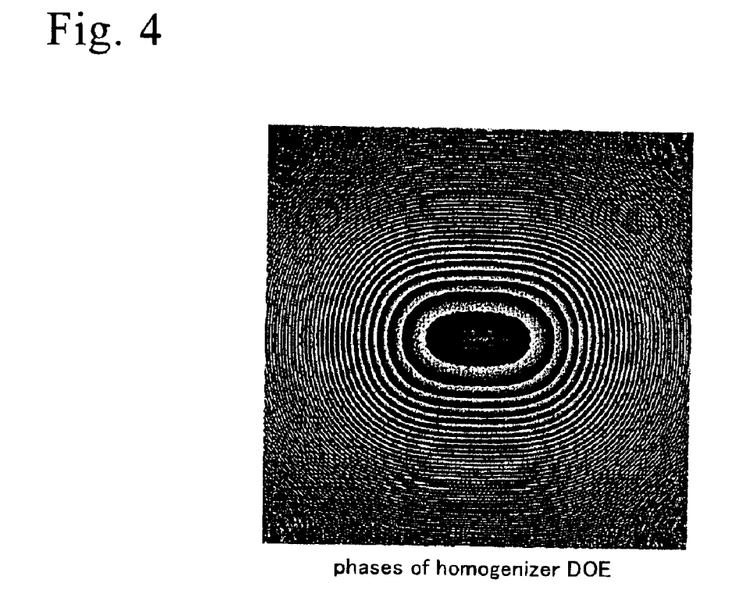
FIG. 4 is a sixteen step thickness (phase variation) distribution of a homogenizer DOE having 800 pixels×800 pixels.

FIG. 4 is an isophase diagram of the homogenizer DOE (800 pixels×800 pixels) which denotes phases of pixels by a grey tone variation from white to black. The full size of the DOE is 50 mmφ. Since the periphery (frame) does not induce diffraction, central effective 800×800 pixels are shown. Phase variation is equivalent to thickness variation of the DOE. The thickness variation takes 16 digital values. However, FIG. 4 shows the step value by the gray tone variation.

In FIG. 4, one fringe contains 16 steps of thickness variation. A distance from a white fringe to a next white fringe corresponds to 32 steps. Fringes are isothickness curves or isophase curves. A change from a fringe to a next similar fringe is a thickness difference of $\lambda/(n-1)$. Fringes can be deemed also to be the distribution of phase changes (0–360 degrees) of passing light.

A DOE is not equivalent to a lens. The function of a DOE is not easily understood from the tone-varying figure. The homogenizer DOE has a function similar to an intensity-modifying lens. Insight teaches us that the central concentric ellipsoids have a converging function as a convex lens. The DOE converges a 2 mmφ cylindrical beam into a 1.2 mm×0.6 mm rectangle beam. Vertical fringes reduces the beam size to 0.6 mm in y-direction stronger than in x-direction to 1.2 mm. Denser fringes in y-direction correspond to an anisotropic final section of the beam.

There is a lateral (x-) direction-extending portion having a convex lens function in the homogenizer DOE of FIG. 4. But the x-direction convex function is weaker than the y-direction extending convex function. The spacing of the fringes is wider in y-direction. The DOE reveals a set of a plurality of concentric ellipsoids of fringes. The reason why the DOE is an assembly of ellipsoids is that the object beam section is not an isotropic circle but a rectangle having a side ratio of 1:2.

The DOE has a function of converging the 2 mmφ beam to a rectangle beam of 1.2 mm×0.6 mm as well as a function of homogenizing a Gaussian beam into a uniform beam. The converging function gives the DOE a definite focal length $f_1$=70 mm like a convex lens.

FIG. 5 is an actual intensity distribution of the homogenized beam at the aperture mask. White means high beam intensity. Black means background without beam. Inherently, FIG. 5 is represented by continuously varying tones between white and black. The beam is a supergaussian homogenized one without intermediate tones. Thus, the intensity distribution figure seems to be a binary figure of a white rectangle in a black background. FIG. 5 shows a rectangle beam of a lateral length 2c=1.2 mm and a vertical width 2d=0.6 mm. The lateral direction is defined to be parallel with x-axis. The vertical direction is defined to be parallel with y-axis.

Figure 6:
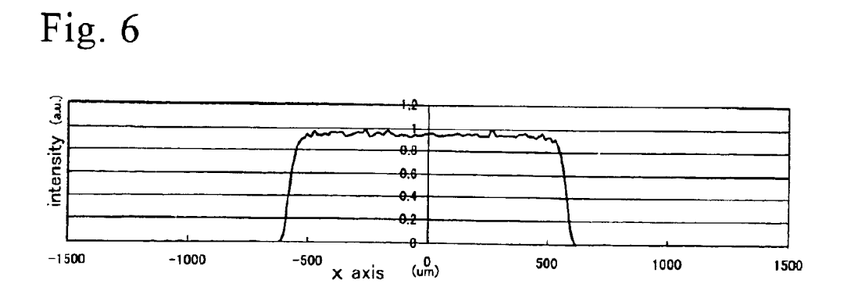
FIG. 6 is a power distribution graph on x-axis of a 1.2 mm×0.6 mm supergaussian beam homogenized by a homogenizer DOE at the aperture mask.

FIG. 6 is an intensity distribution of the homogenized beam in x-direction at the position of the aperture mask. The abscissa is measuring positions on x-axis. The ordinate is intensity (arbitrary unit) of the beam. The x-direction breadth is wide and the beam intensity is nearly constant within a plateau region from −500 μm to +500 μm. The diffraction rate is 95.92% as aforementioned. Small fluctuation appears in the plateau of ±500 μm.

There are groups of weak noise on x-axis at a left periphery beyond −600 μm and at a right periphery beyond +600 μm in FIG. 6. In the rough scale, noise is nearly indiscernible from x-axis. The DOE diminishes a 2 mm horizontal beam diameter to a 1.2 mm side by gathering horizontally extended wave components nearly to ±0.6 mm edges in x-direction. The DOE plays an easy role in x-direction. FIG. 4 denotes fewer elliptical fringes in x-direction than in y-direction. Diffraction is more moderate in x-direction. This is the reason why noise is weaker at x-axis peripheries.

Figure 7:
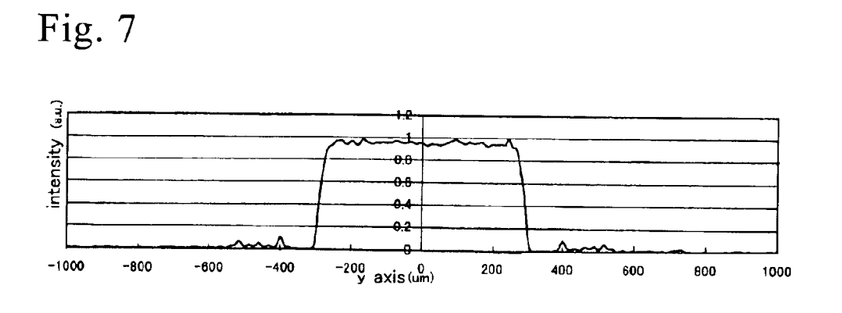
FIG. 7 is a power distribution graph on y-axis of a 1.2 mm×0.6 mm supergaussian beam homogenized by a homogenizer DOE at the aperture mask.

FIG. 7 is a graph of measured power distribution of the homogenized beam in y-direction (vertical) at the spot of the aperture mask. The vertical size is about 2d=600 μm which is half of the x-direction size. The abscissa of FIG. 7 is enlarged by 1.5 times of FIG. 6. The homogenized beam has a nearly uniform power density from y=−250 μm to y=+250 μm in the vertical direction. Noise appears at an upper periphery from y=+400 μm to y=+600 μm and at a lower periphery from y=−400 μm to y=−600 μm. Y-extending noise (FIG. 7) is larger than x-extending noise (FIG. 6).

The reason why noise appears stronger in y-direction than x-direction is clarified. In the thickness distribution of the homogenizer DOE of FIG. 4, isophase fringes are denser in y-direction than in x-direction. In y-direction, the converging function is strong, in particular, at y=±300 μm−±1000 μm (original beam radius is 1000 μm). In the case of a lens, no diffraction occurs. Unlike a lens, a DOE, which bends beams by the diffraction, is plagued by noise which is generated by higher order diffraction and 0th-order diffraction. A DOE is not equivalent to a lens for the reason.

For example, when a convex lens is transformed into an identical Fresnel lens. The object Fresnel lens consists of many concentric circular isophase fringes with intervals diminishing outward. Individual fringes are slanting annular planes which refract rays by Snell's law and have a refractive function similar to a corresponding part of the original convex lens. The Fresnel lens, however, diffracts rays by many isophase concircular fringe edges. The Fresnel lens yields diffraction rays and refraction rays. A beam output from the Fresnel lens is a sum of diffracted rays and refracted rays. An edge step height is determined to be equal to a thickness $(=\lambda/(n-1))$ producing a 2π phase (one wavelength) difference. Both refracted rays and diffracted rays have a common focal length f. An identical DOE can be obtained by replacing a continuous rugged surface of the Fresnel lens by xy-quantized pixels having flat steps. At the conversion from the Fresnel lens to the DOE, all the annular slants disappear and flat pixel steps appear. The refracted rays die out. Configuration of heights and positions of the pixels of the DOE are the first approximation of annular isophase slants of the Fresnel lens. Appearance of flat steps and pixel repetitions incurs higher orders of diffraction. The higher order diffraction which causes noise is a drawback of the DOEs.

Step thickness (height) distribution is designed for endowing the DOE with the converging function identical to the original convex lens. However, such lens/DOE identification is valid only for the first order diffraction rays. Besides the first order one, the 0th order, −1st order, +2nd order diffraction rays are additionally yielded from the DOE. The 0th order ones are straight-progressing rays which do not exist in a lens but accompany a DOE which is a set of pixels of flat tops.

An original lens has no correspondent to the 0th, −1st, +2nd, −2nd, +3rd . . . order diffraction. A DOE is plagued with unnecessary 0th, −1st or higher order diffraction rays. Straight-progressing 0th-order rays are produced on all the surface of the DOE including peripheries beyond ±0.6 mm. The 0th order diffraction is one of the origins of noise. The 1 st diffraction induces diverging rays which are other origins of the noise. The first order diffraction (desired components of diffraction) cannot cancel these sets of noise which are induced by various reasons. Noise within peripheries between ±400 μm and ±600 μm is yielded by the above reasons. Noise appears in y-direction stronger than in x-direction in the example. It is because convergence is stronger in y-direction (2 mm→0.6 mm) than in x-direction (2 mm→1.2 mm).

Noise-annihilation is an object of placing an aperture mask at the focus of the homogenizer DOE. This is a conspicuous feature of the present invention. However, the role of the aperture mask upon the whole optics is not obvious yet. Thus, all the optical parts are described.

In FIGS. 1 and 3, a homogenized square-sectioned supergaussian beam is branched by the diverging DOE 5 into an arbitrary number of beams with arbitrary directions. In this experiment, the divided beam number is assumed to be three. Power fluctuation occurs in any number of separated beams in a similar manner.

Figure 8:
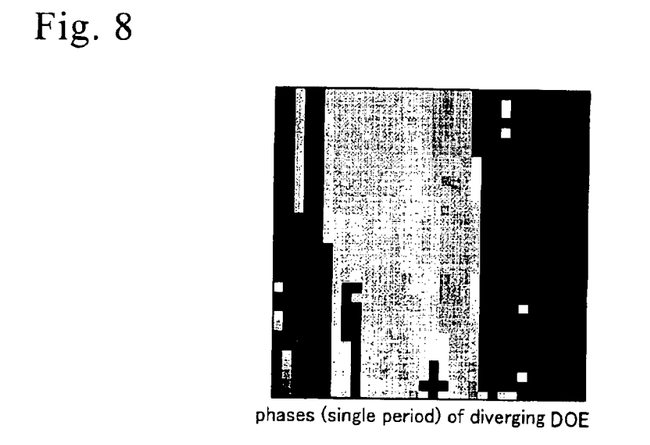
FIG. 8 is a sixteen step thickness (phase variation) distribution of a unit cell with 32 pixels×32 pixels of a diverging DOE having 800 pixels×800 pixels.

The diverging DOE has been designed to be repetitions of a unit pattern with phase-change distribution shown in FIG. 8. A DOE has inherently a thickness-varying pixel distribution for inducting phase-variation of light. The thickness variation has sixteen steps for discretely changing the phase of penetrating rays by sixteen steps from 0 degree to 360 degrees. Namely one step corresponds to 22.5 degrees of phase change. The DOE pattern in FIG. 8 can be considered to be a phase-change pattern as well as a thickness (height)-changing pattern. A spacing from a white pixel via grey, black pixels to the next white pixel corresponds to phase-change difference of 360 degrees. Such a rule is common to both the homogenizer DOE and the diverging DOE.

FIG. 8 shows a thickness distribution of a unit pattern (32 pixels×32 pixels) in the diverging DOE. A white square at a right lower region is a pixel. Grey tone variations correspond to heights of pixels. The DOE is built by aligning 25×25 unit patterns in x- and y-directions. A wide grey zone lies at a middle. Tiny dots signify the degree of the grey tone which corresponds to phases from 0 degree to 360 degrees.

The diverging DOE contains a plurality of identical unit-patterns distributing in lengthwise and crosswise directions. A unit-pattern has 32×32 pixels. Rays diffracted by the DOE make a dot image having 32×32 periodically distributing dots on an image plane. The intensity distribution on the image plane is given by the Fourier transform of pixel height (thickness) distribution of a unit-pattern. The intensity distribution can be easily calculated by FFT (Fast Fourier Transform) of pixel heights on a unit pattern on a computer.

FIG. 8 shows an example of a unit-pattern which has 32×32 pixels. A diverging DOE is a set of two-dimensionally, periodically aligning identical unit-patterns. Periodicity is an essential character of the diverging DOE (FIG. 8). Comparison of FIG. 4 and FIG. 8 clarifies the difference of a non-periodical homogenizing DOE without unit-patterns and a periodical diverging DOE having identical unit-patterns. The foregoing homogenizer DOE which has two functions of a homogenizer and a converging lens has a plurality of concentric ellipsoids as shown in FIG. 4. The homogenizer DOE is a Fresnel type DOE having a definite focal length.

On the contrary, the diverging DOE which is a Fraunhofer type DOE without converging power has no concentric circles. The diverging DOE plays a simple role of making branched identical beams with a definite interval. 360 degrees are enough to a full range of phase differences of rays passing pixels. A single fringe corresponds to 360 degree phase difference. The full range is 360 degrees of phase differences. The diverging DOE has no concircular multi-fringe (FIG. 8) unlike the homogenizer DOE (FIG. 4). It is possible to design a diverging DOE which makes arbitrary number of separated beams ($M_x \times M_y$). In the present example, the diverging DOE simply divides one beam into three identical beams ($M_x=3$, $M_y=1$). Any diverging DOE has no unique solution but has a variety of solutions. A three beams generating DOE has many sets of probable pixel thickness distributions. FIG. 8 is an example of a unit-pattern of a three beam generating DOE. There are many other probable unit-patterns which realize three definite-measured identical patterns on an image plane.

Figure 9:
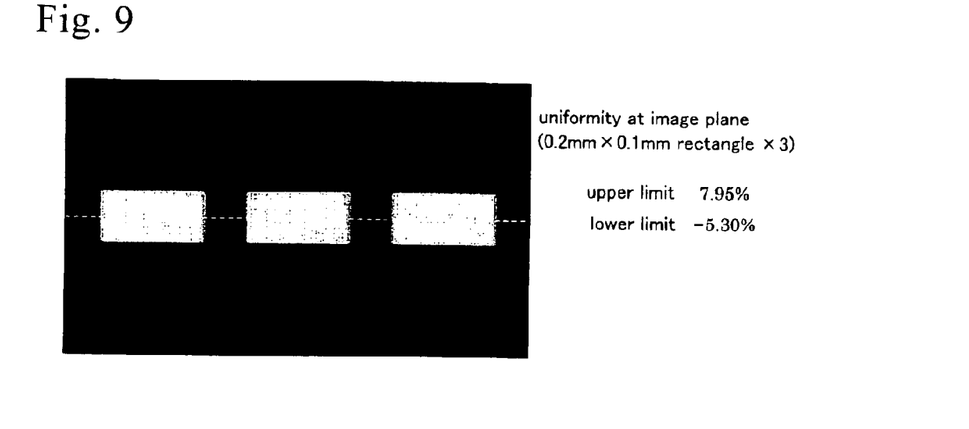
FIG. 9 is a power intensity distribution of three 0.24 mm×0.12 mm sectioned branched beams which are generated by allowing a supergaussian beam to pass through a wide aperture mask of the present invention and dividing a supergaussian beam into three branched beams by a diverging DOE.
Figure 10:
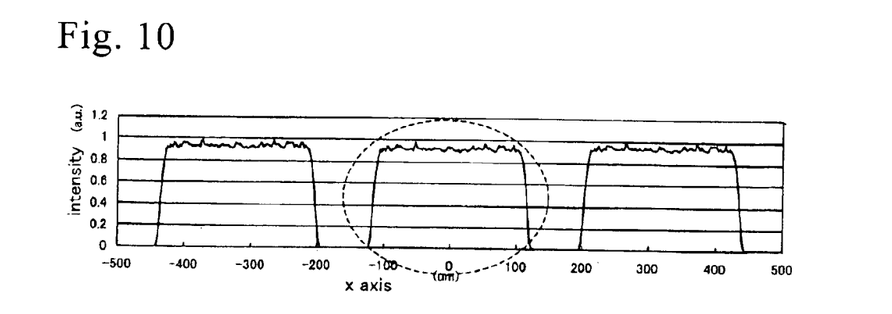
FIG. 10 is an on-x-axis power intensity graph of three 0.24 mm×0.12 mm sectioned branched beams which are generated by allowing a supergaussian beam to pass through a wide aperture mask of the present invention and dividing the supergaussian beam into three branched beams by a diverging DOE.
Figure 11:
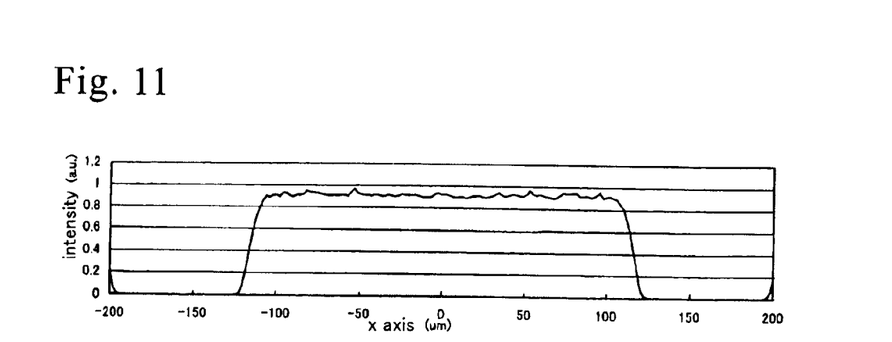
FIG. 11 is an enlarged on-x-axis power intensity graph of the middle beam of the three 0.24 mm×0.12 mm sectioned branched beams which are generated by allowing a supergaussian beam to pass through a wide aperture mask of the present invention and dividing the supergaussian beam into three branched beams by a diverging DOE.

FIG. 9 is three patterns made by the three-diverging beams projected on an image plane. The DOE including a set of the identical unit-patterns of FIG. 8 makes three identical rectangular irradiated zones on the image plane. Three rectangular white zones align in x-direction with a definite interval. A white zone is a 0.2 mm×0.1 mm rectangle. FIG. 10 shows a result of measurement of diffracted, branched beam intensity distribution along x-axis. Three rectangular plateaus with an about 200 μm length correspond to the three irradiated zones in FIG. 9. Intensity distributions of three plateaus are nearly flat. The intensity ranges from 0.9 to 1. Small fluctuation of the power accompanies three plateaus. FIG. 11 is a horizontally enlarged graph of the middle plateau of FIG. 10 for showing plateau fluctuation and side noise. The irradiated zone in the 0.2 mm×0.1 mm rectangle reveals low-fluctuation, uniform, stable distribution with an upper margin 7.95% and a lower margin −5.30%. This means excellency of the diverging DOE.

FIGS. 9–11 show power distribution of diffracted, diverging beams along x-axis. Three plateaus are accompanied by the edges of supergaussian function distribution.

Figure 12:
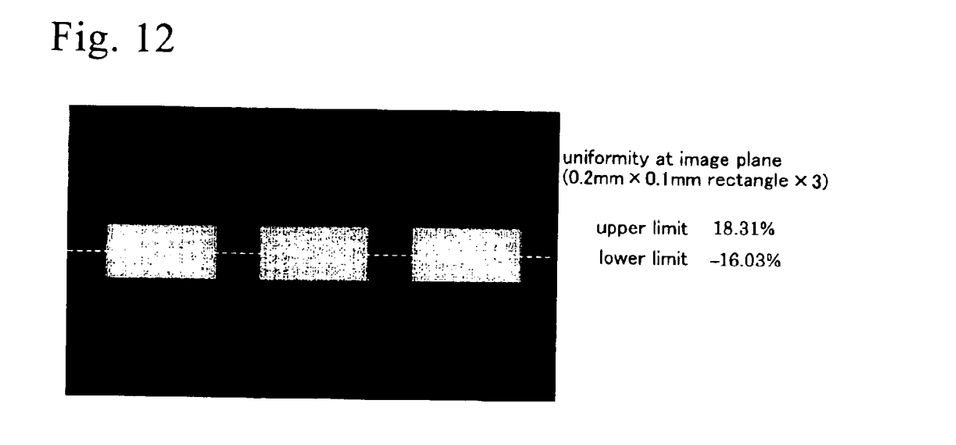
FIG. 12 is a power intensity distribution of three 0.24 mm×0.12 mm sectioned branched beams which are generated by irradiating a supergaussian beam to a diverging DOE without passing through an aperture mask and dividing the beam into three branched beams.
Figure 13:
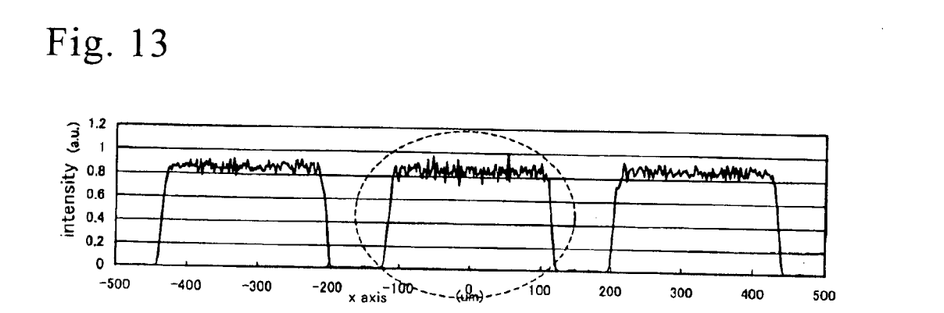
FIG. 13 is an on-x-axis power intensity graph of three 0.24 mm×0.12 mm sectioned branched beams which are generated by irradiating a supergaussian beam to a diverging DOE without passing through an aperture mask and dividing the beam into three branched beams.
Figure 14:
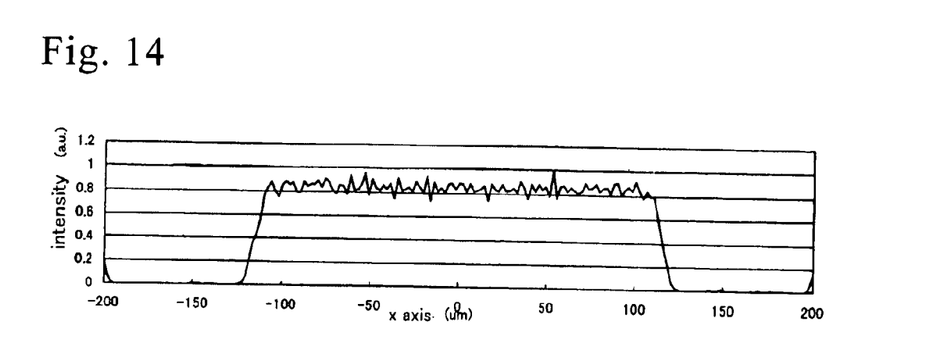
FIG. 14 is an enlarged on-x-axis power intensity graph of the middle beam of the three 0.24 mm×0.12 mm sectioned branched beams which are generated by irradiating a supergaussian beam to a diverging DOE without passing through an aperture mask and dividing the beam into three branched beams.

[2. Comparison Example 1 (non-mask case; FIGS. 12–14)]

Effects of the aperture mask of the present invention are not fully clarified yet. The present invention having such a large-window aperture mask should be compared with a non-mask case omitting an aperture mask and another smaller mask case having an aperture mask with a narrower window which obstructs peripheral portions of a supergaussian beam.

The non-mask case means a system having only a homogenizer 3, a branching element 5, a lens 6 and an image plane 7 in the system of FIG. 1 or FIG. 3. FIG. 12 and FIG. 13 are a section and a power distribution graph of three branched beams on the image plane in the none aperture mask case. FIG. 14 is an enlarged power distribution graph of the middle beam on the image plane.

The non-mask comparison example has a structure similar to Embodiment except non-existence of the aperture mask. FIG. 12 shows three divided beams projected into three separated rectangles of 0.24 mm×0.12 mm of sides defined by the $1/e^2$ attenuation on the image plane. FIG. 13, which is a power distribution graph, shows three zigzag plateaus. The power fluctuation on the three plateaus is bigger than that in FIG. 10 of the present invention. The enlarged middle plateau of FIG. 14 shows large power dispersion from 0.78 to 1. The beam power fluctuation in the uniform region of 0.2 mm×0.1 mm has an upper margin 18.31% and a lower margin −16.03%. The big fluctuation signifies incompetence of the maskless system as a homogenizer.

Figure 15:
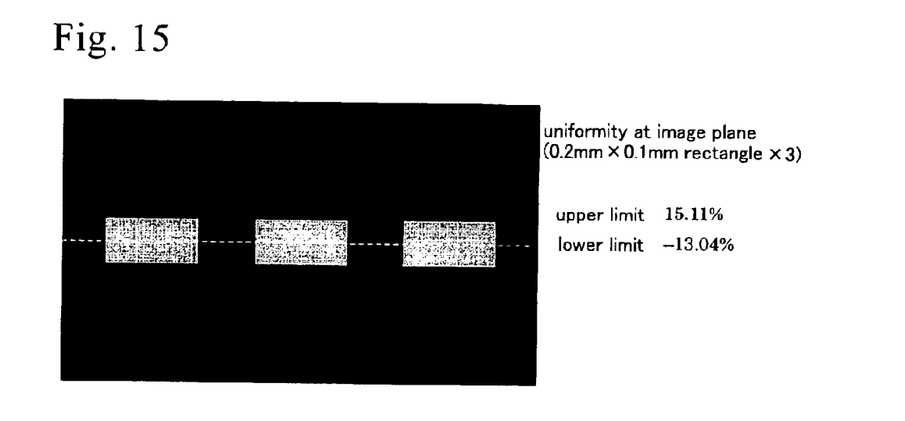
FIG. 15 is a power intensity distribution of three 0.2 mm×0.1 mm sectioned branched beams which are generated by allowing a supergaussian beam to pass through a narrow aperture mask which shields peripheral portions of the beam and dividing the supergaussian beam into three branched beams by a diverging DOE.
Figure 16:
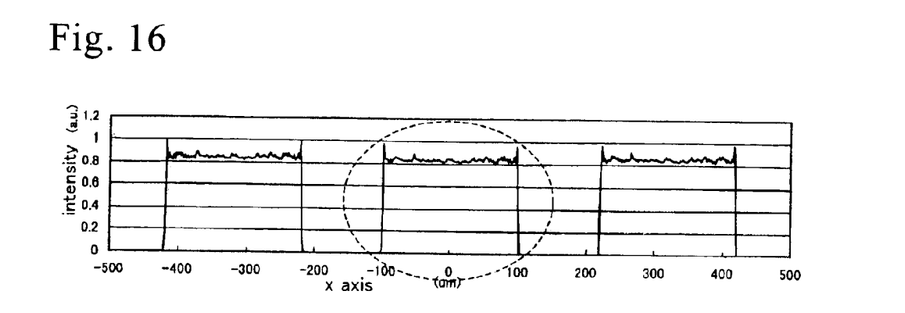
FIG. 16 is an on-x-axis power intensity graph of three 0.2 mm×0.1 mm sectioned branched beams which are generated by allowing a supergaussian beam to pass through a narrow aperture mask which shields peripheral portions of the beam and dividing the supergaussian beam into three branched beams by a diverging DOE.
Figure 17:
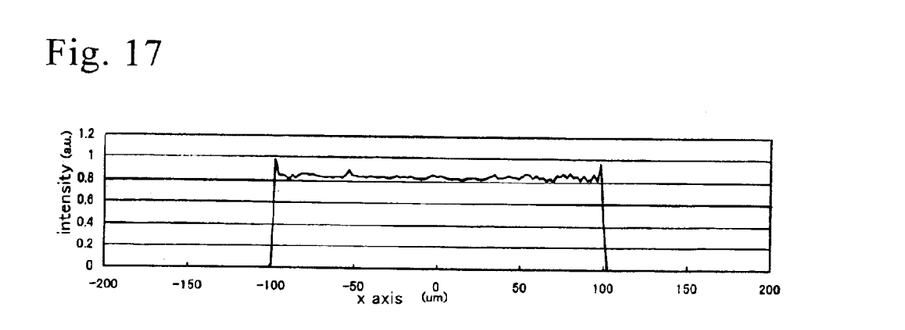
FIG. 17 is an enlarged on-x-axis power intensity graph of the middle beam of the three 0.2 mm×0.1 mm sectioned branched beams which are generated by allowing a supergaussian beam to pass through a narrow aperture mask which shields peripheral portions of the beam and dividing the supergaussian beam into three branched beams by a diverging DOE.

[3. Comparison Example 2 (smaller aperture mask; FIGS. 15–17)]

As mentioned before, the present invention employs a wide window aperture mask which does not obstruct a homogenized beam. Namely, the sides 2c and 2d of the aperture mask (2c×2d) are larger than the sizes 2a and 2b of the homogenized beam (2a×2b). 2c>2a. 2d>2b.

Comparison Example 2 tried a similar diffraction experiment by making use of another aperture mask with a narrower window which does not satisfy the inequalities (2c>2a, 2d>2b). Comparison Example 2 has a homogenizing optics shown in FIG. 1 and FIG. 3. The window of the aperture mask is 1.0 mm×0.5 mm. The homogenized beam has a rectangle of 2a×2b=1.2 mm×0.6 mm. Thus, the window is smaller than the beam section by about 20% in both directions. An about 0.05 mm–0.1 mm wide peripheral part of the homogenized beam is obstructed by the narrower aperture. The use of the smaller aperture mask may be thought to be the best, because the system makes use of only a good-quality inner part of the homogenized beam. But it is not true. Edges including fluctuation are important for establishing good beams projected on the image plane. The narrower aperture experiment was done for indicating that the extraction of the inner beam part would induce large fluctuation of the final beams on the image.

FIG. 15 denotes three narrow-aperture passing beams projected on the image plane. Three similar beam rectangles align along x-axis. The size of the projected beam is 0.24 mm×0.12 mm of the sides defined by $1/e^2$ (x=a, y=b) like Embodiment 1 and Comparison Example 1.

FIG. 16 is a graph of power intensity distribution of three diverging beams of Comparison Example 2. Sharp overshooting surges appear at edges of plateaus of the beam power distribution. The surges are common to six edges of three beam regions.

The power density in intermediate regions is stable with little fluctuation. But, edge surges raise power fluctuation in Comparison Example 2. The fluctuation in the uniform 0.2 mm×0.1 mm regions has a +15.11% margin and −13.04% margin.

The reason why such large surges appear on the edges is considered as follows. The homogenizer DOE generates a 1.2 mm×0.6 mm uniform supergaussian beam from an input Gaussian one. The narrower aperture mask deprives the homogenized beam of moderately-varying peripheries which characterize the supergaussian distribution. The periphery-annihilation by the narrow aperture causes alleviation of the sizes of the beam irradiated regions in FIGS. 15, 16 and 17. The edge overshooting surges result from deficiency of cancellation of edge power which should be induced by masked peripheries of the supergaussian function. The appearance of overshooting end surges teaches us the importance of the aperture mask having a wide window allowing all the homogenized beam parts to pass.

I claim:

1. A multipoint lump homogenizing optical system comprising:
    a homogenizer diffraction optical element (DOE) converting a laser beam having central higher energy density and peripheral lower energy density into a quasi-uniform power distribution beam represented by a 20th–100th order supergaussian function at a definite focus;
    an aperture mask being laid at the focus of the homogenizer DOE and having a window wider than the quasi-uniform homogenized supergaussian beam, wherein the size of the supergaussian beam is defined as a closed loop made by connecting points at which the beam power falls to exp(−2) of the peak power of the supergaussian beam, a diverging diffraction optical element (DOE) for dividing the homogenized supergaussian beam into a plurality of supergaussian beams; and
    a lens for converging the branched supergaussian beams on multipoints defined on an image plane laid at a focus of the lens.

2. The multipoint lump homogenizing optical system according to claim 1, wherein the homogenizer DOE converts a Gaussian laser beam into a quasi-uniform, round-sectioned beam represented by a supergaussian function $\exp\{-2(r/a)^m\}$ (order m=20–100) and the aperture mask has a round window of a diameter 2c which is larger than a diameter 2a of the supergaussian beam (2a<2c).

3. The multipoint lump homogenizing optical system according to claim 1, wherein the homogenizer DOE converts a Gaussian laser beam into a quasi-uniform, rectangular section beam represented by a supergaussian function $\exp\{-2(r/a)^m -2(y/b)^n\}$ (order m=20–100, n=20–100) and the aperture mask has a rectangular window of a size 2c×2d which is larger than a rectangular section 2a×2b of the supergaussian beam (2a<2c, 2b<2d).

4. The multipoint lump homogenizing optical system according to claim 2, wherein the diameter 2c of the round window of the aperture mask is smaller than twice the diameter 2a of the round section of the beam passing the window.

5. The multipoint lump homogenizing optical system according to claim 3, wherein the size 2c×2d of the window of the aperture mask is smaller than twice the size 2a×2b of the section of the beam passing the window.

6. The multipoint lump homogenizing optical system according to claim 4, wherein the diameter of the window of the aperture mask is smaller than a diameter of a region of noise appearing in regions out of the supergaussian beam where the power is less than $e^{-2}$ of the peak power.

7. The multipoint lump homogenizing optical system according to claim 5, wherein the size of the window of the aperture mask is smaller than a size of a region of noise appearing at peripheries of the supergaussian beam.

8. The multipoint lump homogenizing optical system according to claim 3, wherein the rectangular section of the beam made by the homogenizer DOE has a ratio a/b>1.

* * * * *